US010454392B2

(12) United States Patent
Christenson

(10) Patent No.: US 10,454,392 B2
(45) Date of Patent: Oct. 22, 2019

(54) MOTOR DRIVE AND METHOD OF EMERGENCY STOP BRAKING

(71) Applicant: Hubbell Incorporated, Shelton, CT (US)

(72) Inventor: Eric Scott Christenson, Scottsville, VA (US)

(73) Assignee: Hubbell Incorporated, Shelton, CT (US)

(*) Notice: Subject to any disclaimer, the term of this patent is extended or adjusted under 35 U.S.C. 154(b) by 0 days.

(21) Appl. No.: 15/808,360

(22) Filed: Nov. 9, 2017

(65) Prior Publication Data

US 2018/0138837 A1 May 17, 2018

Related U.S. Application Data

(60) Provisional application No. 62/421,154, filed on Nov. 11, 2016.

(51) Int. Cl.
*H02P 3/22* (2006.01)
*H02P 3/12* (2006.01)
*H02P 29/024* (2016.01)

(52) U.S. Cl.
CPC .............. *H02P 3/12* (2013.01); *H02P 29/025* (2013.01)

(58) Field of Classification Search
CPC ........... B60W 30/18127; B60W 10/26; B60W 10/18; B60W 2710/18; B60W 2710/08; B60W 2510/18; B60W 30/188; H02P 27/06; H02P 27/08; H02P 29/021; H02P 3/22; H02P 3/12; H02P 21/36
See application file for complete search history.

(56) References Cited

U.S. PATENT DOCUMENTS

| 5,291,106 | A | * | 3/1994 | Murty | H02P 6/28 318/370 |
| 5,642,023 | A | * | 6/1997 | Journey | B60L 11/1805 318/139 |
| 6,262,896 | B1 | * | 7/2001 | Stancu | B60L 11/1803 318/802 |
| 8,779,710 | B2 | * | 7/2014 | Ichihara | H02P 1/04 318/400.3 |
| 2003/0210006 | A1 | * | 11/2003 | Kusaka | H02P 1/46 318/437 |
| 2008/0110309 | A1 | | 5/2008 | Chang | |
| 2009/0171523 | A1 | * | 7/2009 | Luo | B60W 20/40 701/22 |
| 2009/0267545 | A1 | * | 10/2009 | Viitanen | H02P 3/22 318/380 |

(Continued)

OTHER PUBLICATIONS

PCT/US2017/060873 International Search Report and Written Opinion dated Jan. 23, 2018 (14 pages).

*Primary Examiner* — Thai T Dinh
(74) *Attorney, Agent, or Firm* — Michael Best & Friedrich, LLP

(57) ABSTRACT

A method of performing an emergency stop of a motor is disclosed. The method includes powering a controller with a power supply after an external power source ceases providing power to the motor, controlling the motor to operate in a generator mode, optionally applying power from the motor to the control power supply, and electronically braking the motor while in the generator state. Also disclosed is a motor drive performing the method.

20 Claims, 5 Drawing Sheets

(56) References Cited

U.S. PATENT DOCUMENTS

| | | | |
|---|---|---|---|
| 2010/0301816 A1* | 12/2010 | Akita | H02P 9/10 322/34 |
| 2012/0019176 A1* | 1/2012 | Okamura | B60K 6/445 318/376 |
| 2012/0262106 A1* | 10/2012 | Omiya | B60R 16/03 320/104 |
| 2013/0009598 A1* | 1/2013 | Ohtomo | H02J 7/0031 320/109 |
| 2013/0039107 A1* | 2/2013 | Fukuta | B60L 3/003 363/131 |
| 2013/0119784 A1 | 5/2013 | Kim et al. | |
| 2014/0379190 A1 | 12/2014 | Sawada | |
| 2016/0137086 A1* | 5/2016 | Yumita | B60R 16/03 307/10.1 |
| 2016/0362276 A1* | 12/2016 | Wang | B66B 5/16 |

* cited by examiner

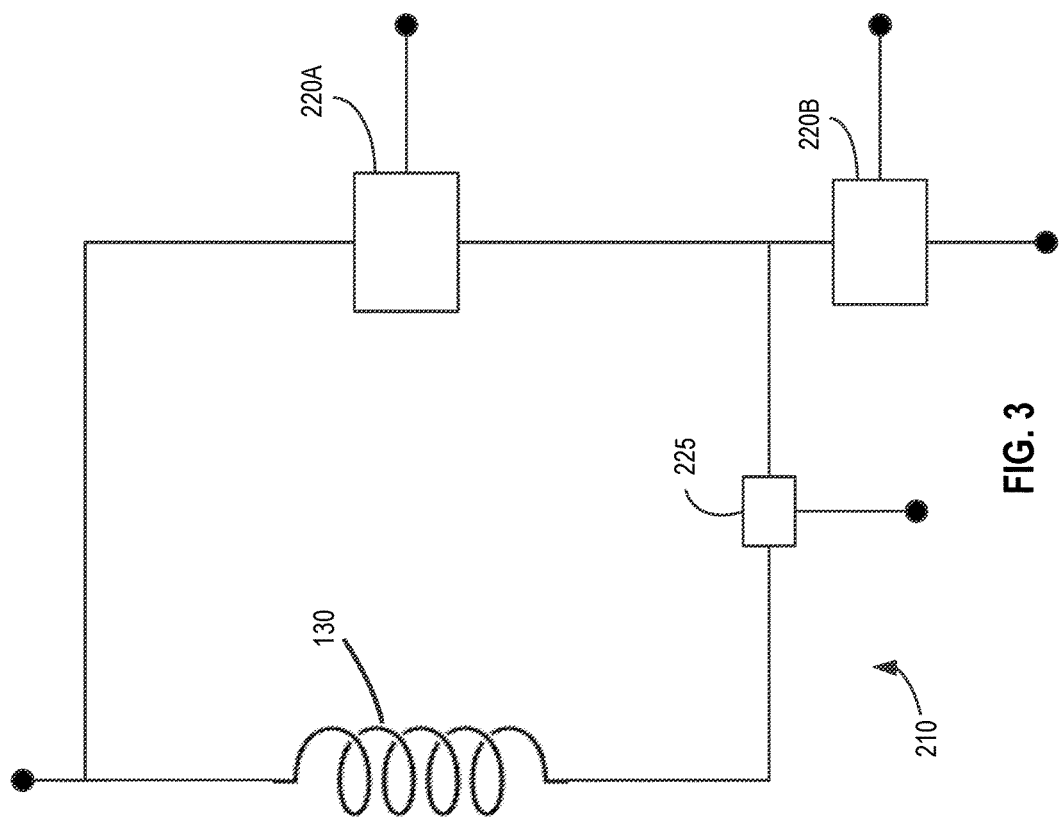

MOTOR DRIVE AND METHOD OF EMERGENCY STOP BRAKING

RELATED APPLICATION(S)

This application is based on U.S. provisional application Ser. No. 62/421,154, filed Nov. 11, 2016, the disclosure of which is incorporated herein by reference in its entirety and to which priority is claimed.

FIELD

The invention relates to a method of controlling a motor to a stop after all power sources have been disconnected for emergency purposes or in unexpected circumstances. The invention also relates to a motor drive system performing the method.

BACKGROUND

A motor and motor drive can be used in many applications. Exemplary applications include a crane, a forklift, or an electric locomotive or vehicle. Emergency stop (also referred to as "e-stop") braking for a motor drive refers to a type of braking that is initiated to stop in-progress application movement when electrical power is removed using the motor circuit and not external mechanical brakes. An exemplary emergency stop brake occurs when an operator operates a hard-wired e-stop input (e.g., pressing an e-stop button) which opens the main power circuit.

In classical, contactor-based motor drives, power loss emergency braking circuits have been known for many years. However, these involve expensive additional contactors to re-arrange the motor circuit and offer little control. An alternative electronic-based solution is desired.

SUMMARY

E-stop braking for a motor drive operates by controlling the motor (or machine) in a generator state where the motor generates electrical power when the power source is removed. The energy generated from the rotation of the motor can be stored in a capacitor and/or can be dissipated on a resistor, such as one in a brake chopper. In one embodiment, the generated energy is also used to operate the electronic controller.

According to an exemplary embodiment, a motor drive system includes a motor (such as a DC series wound motor), a means of storing electricity (such as a capacitor bank), a line connector, a power dump (such as a brake chopper or regeneration absorber) circuit, and a controller. The line connector makes and breaks a connection between the external power source and the remainder of the motor controller system. The power dump circuit includes a dump resistor and an electronic switch for controlling current through the dump resistor to limit the capacitor bank voltage. The controller is configured to receive power from the capacitor bank after the line connector breaks the connection between the external power source and the capacitor bank, to control the motor to operate in a generator state for supplying power to the capacitor bank and thus the controller, and to control the electronic switch to dissipate energy from the motor while in the generator mode.

According to another exemplary embodiment, a motor drive system includes a motor (such as a DC series wound motor), a power supply (such as a capacitor bank), a line connector, a power dump circuit, and a controller. The line connector makes and breaks a connection between the power supply and an external power source. The power dump circuit includes a dump resistor and an electronic switch for controlling current through the dump resistor. The controller is configured to receive power from the power supply after the line connector breaks connection between the external power source and the power supply, control the motor to operate in a generator state for supplying power to the power supply, and control the electronic switch to dissipate energy from the motor while in the generator mode.

According to yet another exemplary embodiment, a method of performing an emergency stop of a motor is disclosed. The method includes powering a controller with a power supply after an external power source ceases providing power to the power supply, controlling the motor to operate in a generator state, applying power from the motor to the power supply, and electronically braking the motor while in the generator state.

BRIEF DESCRIPTION OF THE DRAWINGS

The aspects and features of various exemplary embodiments will be more apparent from the description of those exemplary embodiments taken with reference to the accompanying drawings, in which:

FIG. 3 is an electrical schematic of a field winding circuit capable of being used in the motor drive of FIG. 1.

DETAILED DESCRIPTION OF EXEMPLARY EMBODIMENTS

Figure 1:
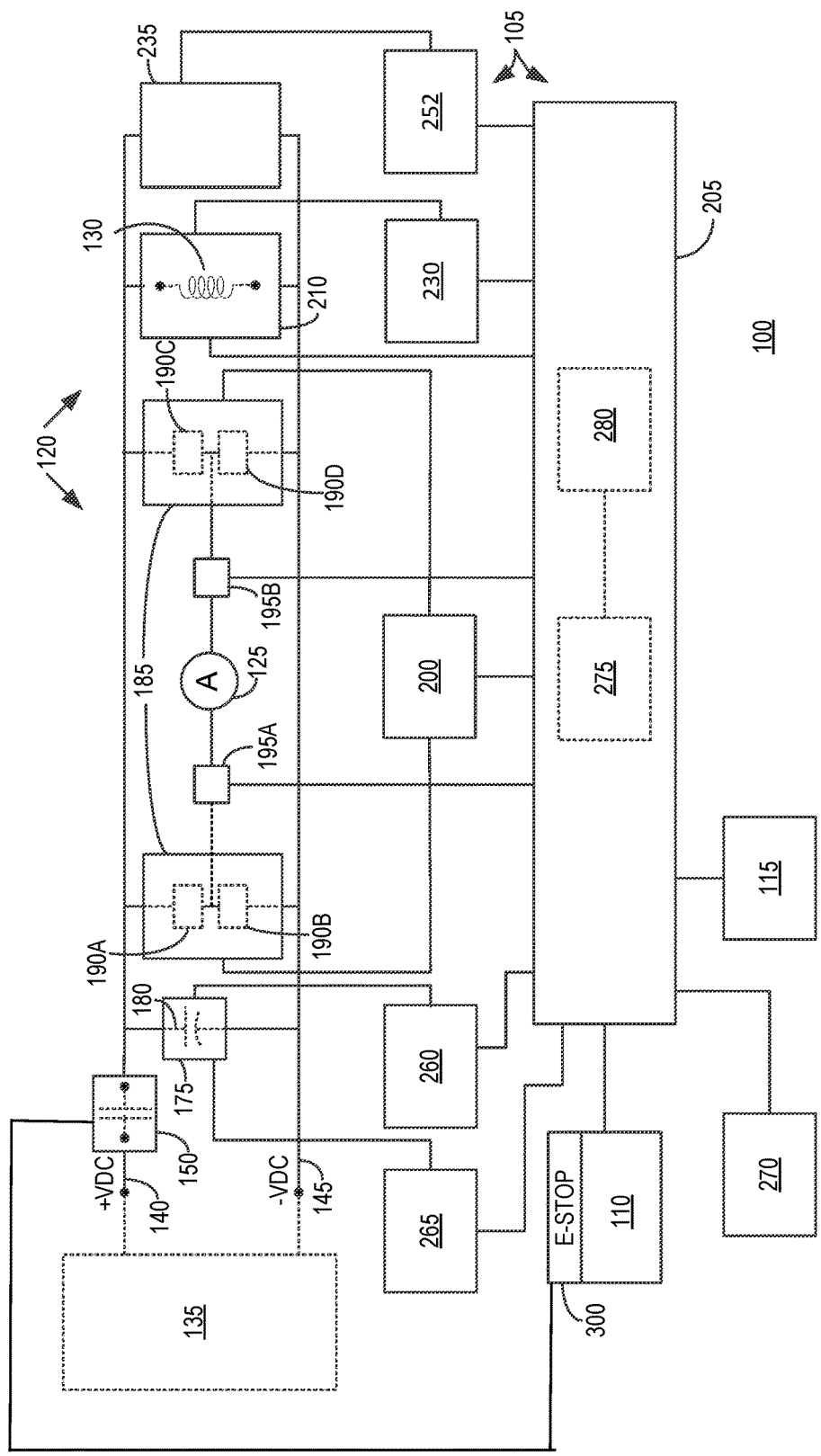
FIG. 1 is a block diagram of a motor drive incorporating aspects of the invention.

Motors are found in many machines, ranging from household appliances to industrial equipment. There are many different types of motors, including induction motors, electric motors, alternating current (AC) motors, direct current (DC) motors, to name a few. The present invention relates to a brushed DC motor, but it would be appreciated by those skilled in the art that other types of motors may be used to achieve the same effects.

In a brushed DC motor, the stator provides a constant magnetic field on the armature windings, which receive an external power source. Current through the armature windings induces an electromagnetic field that rotates the rotor. In other types of motors, the magnetic field provided by the stator may be constant or time-varying. In certain embodiments, the armature windings may be configured to connect a load while the field windings may be configured to receive an excitation current to produce the magnetic field.

Motors may operate in the motor mode or the generator mode. In the motor mode, the motor consumes input electrical power from an external power source to produce mechanical power in the form of torque. In the generator mode, the external power source is removed, and the motor consumes mechanical power in the form of torque from an in-motion rotor to induce electrical power. In some instances, the induced electrical power may be directed to an external circuit for storage or dissipated as heat.

According to various embodiments, a DC motor with an armature can be controlled in a separately-excited circuit, with separate circuits for the armature and the field. The armature can be controlled by a full bridge of transistors, the field winding (either series or shunt) can be connected to a separate chopper, and a brake chopper can be connected to a resistor. A control computer maintains field current when the motor is turning in the motor mode. When the computer detects an e-stop signal from depressing an e-stop button, a line connector circuit opens and electrical connection in an equalizing circuit breaks independent from further computer commands and regardless of computer cooperation. This effectively mimics a loss of external power by discontinuing all power from the external power source to the motor, which begins the process of pulse-braking (also referred to as boost chopping) the armature in the generator mode to convert the mechanical power from the rotating rotor to electrical power. The process of pulse braking uses the full bridge of transistors around the armature as switches that turn on and off at a high frequency. When the transistors switch on and short circuits the armature, the current in the armature increases. Since a spinning armature has a voltage proportional to the rotational velocity and the magnetic field, this current rises at a rate limited by the inductance of the armature windings. When the transistors switch off and an open circuit is created, the increased current and voltage in the armature is directed to and stored in a capacitor bank through a plurality of flyback diodes (also known as freewheeling diodes, reverse direction diodes, suppressor diodes, snubber diodes, etc.). These flyback diodes are included in the full bridge of transistors and form electrical connection between the capacitor bank and the armature when the transistors are switched off. Other types of electronic switches, not detailed herein, may be used as flyback diodes in other embodiments that do not deviate from the function of the present application.

The full bridge of transistors is repeatedly switched on and off at a fast rate to create an average current from the armature to the capacitor bank. The supply voltage stored in the capacitor bank rises at a rate controlled by a predetermined maximum braking current induced in the armature and a capacitance property of the capacitor bank. The computer controls the brake chopper to ensure that the voltage stored by the capacitor bank does not rise too far above the nominal supply voltage. Once the motor has stopped, regeneration is impossible, and the voltage on the supply capacitance may collapse.

This technique can be extended to other motor circuits that return energy to a power source in braking. This is accomplished by reversing the direction of current flow in the armature windings, thereby causing the motor to operate in the generator mode and converting mechanical power to electrical power. In one embodiment, the direction of current flow in the armature may be reversed when external power is removed from the motor circuit or when an emergency e-stop button is pressed. Exemplary motors can include brushless DC motors, permanent magnet motors, and motors connected to alternating current variable frequency drives.

FIG. 1 shows a detailed embodiment of the invention. FIG. 1 illustrates a direct current (DC) series wound motor drive 100. Exemplary applications for the motor drive 100 include the horizontal motions of a crane, a forklift, or an electric locomotive or vehicle. The motor drive 100 uses an electronic control 105 to control the speed, direction, acceleration, and deceleration of the vehicle. The operation of the motor drive 100 can be via a local operator input control no or a remote data control through a data input/output 115. For example, the motor drive 100 may require a speed and/or direction command and the motor drive 100 controls the motor, discussed below, to vary the speed and direction of the application (e.g., the crane or vehicle).

FIG. 1 illustrates a DC series wound motor 120 including an armature 125 and a series wound field 130. The motor 120 is supplied with DC voltage from an external power source 135. The DC voltage is provided by a positive bus line 140 and a negative bus line 145. An exemplary DC voltage is 250 VDC obtained from rectified utility power.

Figure 2:
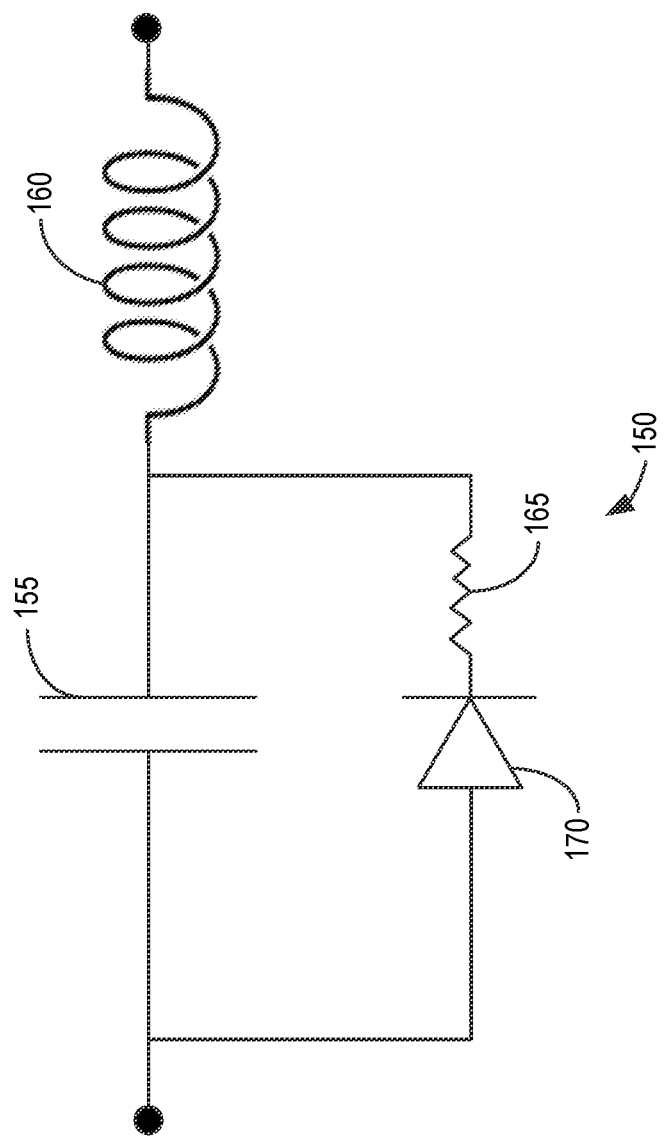
FIG. 2 is an electrical schematic of a line connector circuit capable of being used in the motor drive of FIG. 1 according to one embodiment.

Power is delivered to the motor 120 through a line connector circuit 150. As shown in FIG. 2, the line connector circuit 150 can include a switching element 155, an inductor 160, a charge up resistor 165, and a diode 170. The switching element 155 can be a contactor that makes or breaks a connection past the resistor 165 based on a control relay. When the electronic control 105 commands the switching element 155 to make an electrical connection between the external power source 135 and the motor 120, the supplied current takes the path of least resistance from the positive bus line 140 through the inductor 160 to the motor 120. When the electronic control 105 commands the switching element 155 to break the electrical connection between the external power source 135 and the motor 120, the supplied current is forced to travel through the diode 170 and the charge up resistor 165 to charge a capacitor bank 180. The diode 170 and the charge up resistor 165 form an equalization circuit that serve to equalize the voltage across the switching element 155 before forming a connection between the external power source 135 and the motor 120. This prevents damage to circuit elements resulting from a high and unequalized voltage transferred across a low impedance line contactor. When the switching element 155 is open, the trivial power allowed through the diode 170 and the charge up resistor 165 for equalization purposes is not sufficient to run the motor 120. The switching element 155 can be other connectors such as transistors, electromechanical or electronic switches or relays, and combinations thereof. It is envisioned that the charge up resistor 165 may be replaced by other equalizing circuit configurations, including but not necessarily limited to a switch element in series with the charge up resistor 165. Such additional equalizing circuit configurations may also be used to equalize the voltage across the switching element 155 without deviating from the teachings of the present application.

It should be noted that the specific configuration of the present invention described above is not comprehensive, and that other configurations may be possible to achieve substantially the same effect. For example, the line connector circuit 150 may also be connected to the negative bus line 145, and, with reversed polarity of a plurality of flyback diodes (described in further detail below) in the full bridge of rectifiers, this exemplary configuration would achieve the same effects described in the present application.

Figure 2A:
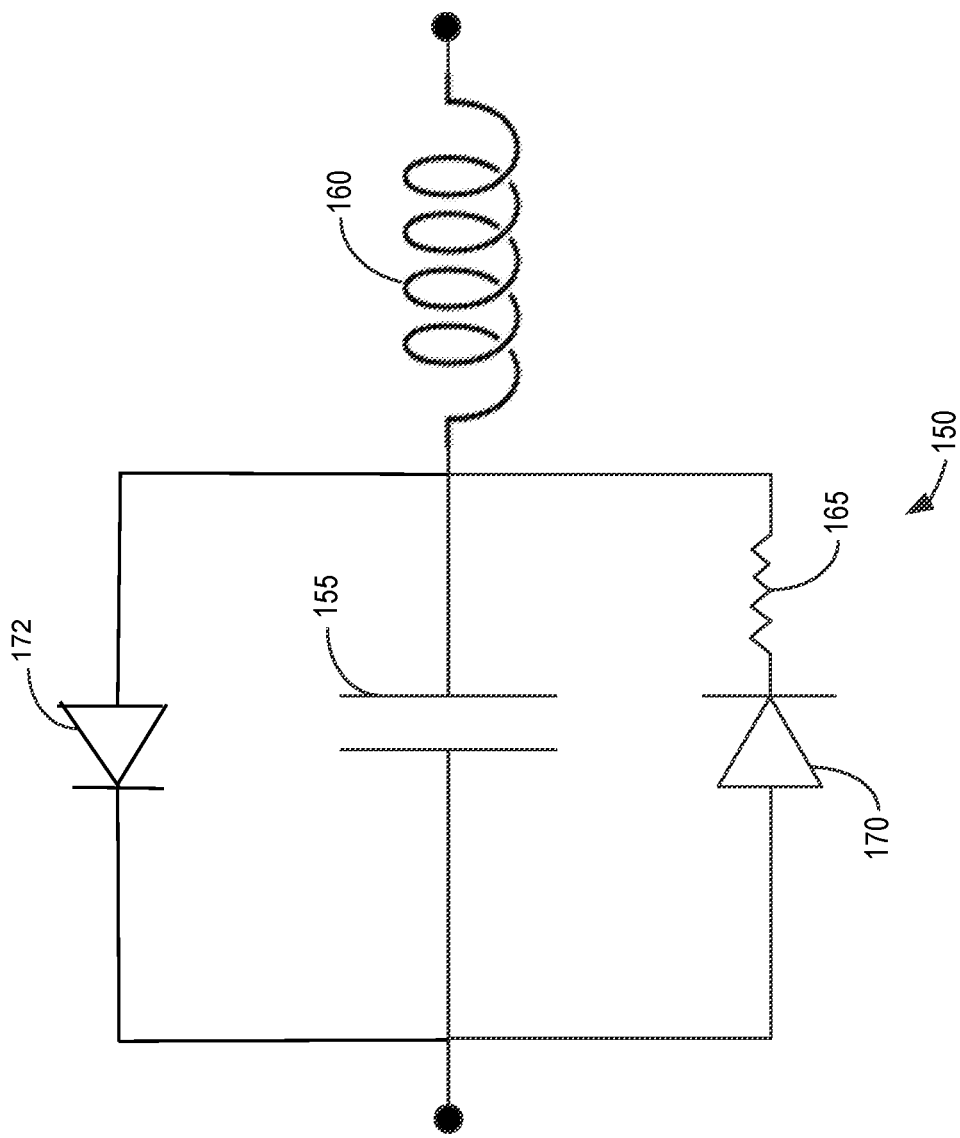
FIG. 2A is an electrical schematic of a line connector circuit capable of being used in the motor drive of FIG. 1 according to another embodiment.

In another embodiment of the line connector circuit 150 shown in FIG. 2A, a second diode 172 is connected in parallel to the switching element 155 with its anode connected to the inductor 160 and its cathode connected to the positive bus line 140. The second diode 172 allows the current from the motor 120 to return to the positive bus line 140 when the switching element 155 is off or open. Returning the power from the motor 120 to the external power source 135 results in pulse-braking of the armature to generate electrical energy from mechanical torque. This allows for efficient braking of the motor drive without the need of external mechanical brakes in addition to regeneration and storage of energy for future use.

A capacitor pre-charge circuit 175 (FIG. 1) includes a capacitor bank 180. When the switching element 155 is open, the capacitor bank 180 charges at a controlled rate via the charge-up resistor 165. The diode 170 in series with the resistor 165 provides reverse polarity protection to the line connector circuit 150. Once most of the voltage on the capacitor bank 180 is obtained, the switching element 155 closes or makes a direct connection to the positive VDC bus 140. The capacitor bank 180 holds voltage on the positive bus 140 constant as the motor drive 100 pulses the motor 120 in the motor mode. It should be noted that when the second diode 172 is added to the line connector circuit 150 as shown in the embodiment of FIG. 2A, the diode 170 will no longer provide reverse polarity protection for the line connector circuit 150.

A bridge circuit 185 controls a current through the armature 125. The shown construction includes bridge transistors 190A-D. The bridge transistors 190A-D, which can be insulated gate bipolar transistor (IGBTs), are arranged in an H-bridge configuration with the armature being in the center of the bridge. A plurality of flyback diodes are included (not shown or enumerated) in the full bridge of transistors and serve to direct current from the armature 125 to the capacitor bank 180 or back to the external power source 135 when the transistors 190A-D are off or open. It is also known that the top (or bottom) of the half-bridges around the armature can be contactors (e.g., bypass contactors) or SCRs and not IGBTs. Also in the center of the bridge is a current sensor. The current sensor includes, for the shown construction, hall-effect sensors 195A, B. The bridge transistors 190A-D are driven by a bridge driver 200 controlled by a controller 205. It is envisioned that the bridge transistors 190A-D can be directly controlled by the controller 205 or can include more than the single bridge driver 200 shown. It is also understood that the bridge transistors 190A-D will conduct power supply from the positive bus 140 to the armature 125 on command, or from the armature 125 to the negative bus 145 on command. The bridge transistors 190A-D can also conduct in the reverse direction and controlled to not conduct in the forward direction when flyback diodes are included in the transistor bridge and reverse voltage is applied.

The field winding 130 is an electromagnet used to generate a magnetic field in an electro-magnetic machine. The field winding 130 is part of a field winding circuit 210. The field winding circuit 210 (FIG. 3) includes the field winding 130, a current sensor 225, and bridge transistors 220A, B in a half-bridge configuration. The bridge transistors 220A, B can be two IGBTs controlling the current and polarity of the field winding 130. The current sensor 225 can include a hall-effect sensor. The bridge transistor 220B can also be a simple diode. The bridge transistors 220A, B are driven by a field driver 230. It is envisioned that the bridge transistors 220A, B can be directly controlled by the controller 205.

Figure 4:
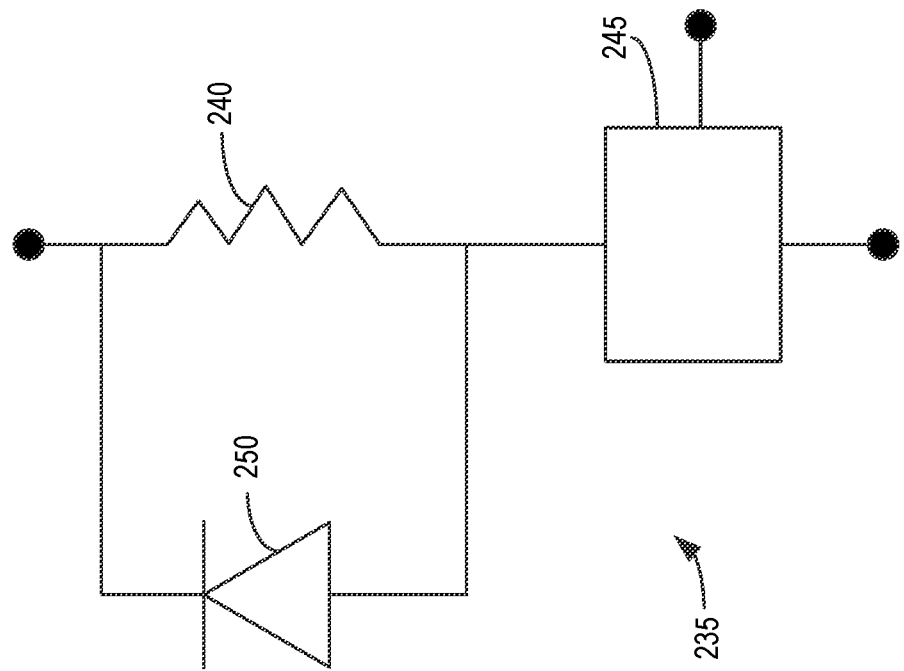
FIG. 4 is an electrical schematic of an overvoltage dump or brake chopper circuit capable of being used in the motor drive of FIG. 1.

An overvoltage dump circuit, or brake chopper, 235 (FIG. 1) is connected in parallel to the capacitor bank 180 in the pre-charge circuit 175. Referring to FIG. 4, the overvoltage dump circuit includes a dump resistor 240, a switching element 245, and a diode 250. The switching element 245 can be a transistor such as an insulated gate bipolar transistor (IGBT), and is driven by a driver 252, which may also be controlled by controller 205. When the voltage on capacitor bank 180 is high, the switching element 245 connects the dump resistor 240 across the capacitor bank 180. This allows a controlled discharge from the capacitor bank 180. As the charge on the capacitor bank 180 dissipates, the switching element 245 breaks the connection. The resistor 240 may have has some latent energy (or inductive "kick") when the connection is broken. The diode 250 recirculates the latent energy to be dissipated again across the dump resistor 240.

The series-wound DC motor 120 connects the armature 125 and the field winding 130 with the external power source 135, capacitor bank 180, the line connector circuit 150, and the positive and negative bus lines 140 and 145, respectively. The motor speed varies as a non-linear function of load torque, field current, and armature current. The series DC motor 120 can also act as a generator during some operations, as further discussed below.

Referring back to FIG. 1, the motor drive 100 further includes a power supply 260, a voltage sensor 265, the controller 205, the data input/output (I/O) 115, the operator input control 110, and an operator display 270. The motor drive 100 can include a plurality of additional passive and active components such as resistors, capacitors, inductors, integrated circuits, conditioners, and amplifiers. These components are arranged and connected to provide a plurality of electrical functions to the circuit boards including, among other things, filtering, signal conditioning, or voltage regulation as is commonly known.

In some constructions, the controller 205 is understood to be a general-purpose or special-purpose digital processor or computer suitable for executing stored programs, accepting sensory inputs, and controlling outputs. It may perform other functions not described herein. The control includes a processor 275 (e.g., a microprocessor, a digital signal processor, a microcontroller, or another suitable programmable device), and a memory 280. The memory 280 includes, for example, a read-only memory ("ROM"), a random access memory ("RAM"), a direct memory access (DMA) an electrically erasable programmable read-only memory ("EEPROM"), a flash memory, a hard disk, or another suitable magnetic, optical, physical, or electronic memory device. The processor 275 is connected to the memory 280 and executes firmware that is capable of being stored in the RAM (e.g., during execution), the ROM (e.g., on a generally permanent basis), or another non-transitory computer readable medium such as another memory or a disc. It is also envisioned that the processor 275 can encompass multiple processors and the memory 280 can encompass multiple memories. The controller 205 receives sensory signals (analog and/or digital) from other components (e.g., the hall-effect sensors), and outputs control signals to other components (e.g., the drive circuit). It is to be understood that the controller 205 performs other functions and operations not described herein normally associated with the motor drive 100. The controller 205 can be powered separately from the motor circuit, for example by a battery or AC grid power. It would be appreciated by those skilled in the art that the processor and computer system described above may be replaced by a series of Operational Amplifiers (OPAMPS), Comparators, and other non-digital components to accomplish the same results.

Operator disconnect, not resulting from a computer disconnect, can occur in emergency situations, e.g., from pressing a hardwired e-stop button 300. The e-stop 300 breaks the line connector circuit 150, thereby disconnecting the external power source 135 from the motor 120, regardless of whether the computer cooperates or not. Other situations may result in power not being available to the motor 120 on the positive VDC bus 140 and the negative VDC bus 145.

In the armature 125, an electromotive force (EMF) is created by the relative motion of the armature and the field. When the machine acts in a motor mode, this EMF opposes the armature current, and the armature 125 converts electrical power to mechanical power in the form of torque, and transfers it to the load (i.e., application) via a shaft. When the machine acts in a generator mode, the armature EMF drives the armature current, and shaft mechanical power is converted to electrical power and transferred to the capacitor bank 180.

In one operation, the motor drive 100 in generator mode maintains a minimum field on the armature 125 and charges the capacitor bank 180. This allows the capacitor bank 180 to continue to power the controller 205 via the power supply 260 and controllably brake the motor 120. Excess power from the armature can be applied to the overvoltage dump circuit 235. The overvoltage dump circuit 235 can be used to act as a brake chopper to help control the braking of the motor 120. The controller 205 can controllably bring the motor and load to a stop even when the controller 205 is disconnected from the external power source 135.

The braking chopper (i.e., of the overvoltage dump circuit 235) in the present embodiment is an electrical switch that controllably reduces the energy of the motor 120 by turning on the switching element 245 and directing the braking energy to the dump resistor 240, where the braking energy is dissipated as heat. The braking chopper is automatically activated when the voltage supplied by the positive VDC bus 140 or the charge of the capacitor bank 180 exceeds a specified level.

The foregoing detailed description of the certain exemplary embodiments has been provided for the purpose of explaining the general principles and practical application, thereby enabling others skilled in the art to understand the disclosure for various embodiments and with various modifications as are suited to the particular use contemplated. This description is not necessarily intended to be exhaustive or to limit the disclosure to the exemplary embodiments disclosed. Any of the embodiments and/or elements disclosed herein may be combined with one another to form various additional embodiments not specifically disclosed. Accordingly, additional embodiments are possible and are intended to be encompassed within this specification and the scope of the appended claims. The specification describes specific examples to accomplish a more general goal that may be accomplished in another way.

Terms of degree, such as "substantially" or "approximately" are understood by those of ordinary skill to refer to reasonable ranges outside of the given value, for example, general tolerances associated with manufacturing, assembly, and use of the described embodiments.

What is claimed:

1. A motor drive system comprising:
   a motor;
   a power supply;
   a line connector for making and breaking a connection between the power supply and an external power source;
   a power dump circuit including a dump resistor and an electronic switch for controlling current through the dump resistor;
   and a controller to
      control the motor to operate in a motor state for converting electrical energy from the external power source to mechanical energy in the motor,
      control the motor to operate in a generator state for supplying power to the power supply,
      receive operational power from the motor, while in the generator state, via the power supply after the line connector breaks connection between the external power source and the power supply, and
      control the electronic switch to dissipate energy from the motor while in the generator state,
   wherein the generator state applies power from the motor to the power supply to electronically brake the motor.

2. The motor drive system of claim 1, wherein the power supply includes capacitors.

3. The motor drive system of claim 1, further comprising an emergency stop control to disconnect all electrical connection from the external power source to the motor made by the line connector in the motor state.

4. The motor drive system of claim 3, wherein the emergency stop control disconnects all electrical connection made by the line connector independent of the controller.

5. The motor drive system of claim 1, wherein the line connector includes a contactor.

6. The motor drive system of claim 5, wherein the line connector further includes an equalization circuit to equalize the voltage across the contactor.

7. The motor drive system of claim 1, wherein the line connector further includes a reverse diode configured to return power from the motor to the external power source.

8. The motor drive system of claim 1, wherein the motor includes a DC series wound motor having an armature winding and a field winding.

9. The motor drive system of claim 8, wherein the controller includes a field winding control circuit to control the field winding and an armature winding control circuit to control the armature winding, the field winding control circuit and the armature winding control circuit being separate from each other.

10. The motor drive system of claim 8, wherein the motor includes a plurality of switches in electrical communication with the armature winding.

11. The motor drive system of claim 10, wherein the motor includes a plurality of diodes in electrical communication with the plurality of switches and the armature winding, the plurality of diodes configured to conduct electricity when the plurality of switches are turned off.

12. The motor drive system of claim 11, wherein the armature winding is boost-chopped by switching the plurality of switches on and off at a high frequency to convert a mechanical energy to an electrical energy, thereby braking the motor in the generator state.

13. The motor drive system of claim 12, wherein the electrical energy is directed to the power supply through the plurality of diodes, the power supply being configured to store the electrical energy and power the controller.

14. The motor drive system of claim 1, wherein when the electronic switch is on, excess voltage on the power supply that exceeds a predetermined value is directed as current to the dump resistor where the current is dissipated as heat.

15. A method of controlling a motor drive to perform an emergency stop of a motor when the motor drive no longer receives power from an external power source, the method comprising:
   controlling the motor to operate in a generator state;
   applying power from the motor to a power supply;
   powering a controller with the motor, operating in the generator state, via the power supply after the external power source ceases providing power to the power supply; and
   electronically braking the motor while in the generator state.

16. The method of claim 15, wherein the power supply includes capacitors, and wherein the applying power from the motor to the power supply includes charging the capacitors.

17. The method of claim 15, and further comprising:
    receiving an emergency stop from an operator interface; and
    breaking connection between the external power source and the power supply in response to receiving the emergency stop.

18. The method of claim 15, wherein the motor drive includes a brake resistor and an electronic switch controlling current through the brake resistor, and wherein braking the motor includes controlling the switch to dissipate excess energy through the brake resistor.

19. The method of claim 15, wherein the motor includes a DC series wound motor having an armature winding and a field winding, and wherein the controlling the motor includes controlling the field winding separately from the armature winding, and the armature winding is boost-chopped to convert a mechanical energy to an electrical energy, thereby braking the motor in the generator state.

20. The method of claim 19, wherein controlling the motor further includes directing the electrical energy to the power supply through a plurality of diodes and storing the electrical energy in the power supply to power the controller.

* * * * *